April 17, 1956    A. E. MUMFORD ET AL    2,742,127

CLUTCHES

Filed March 26, 1952

Inventors:
Albert E. Mumford,
George Tabberer,
by *Richard E. Hosley*
Their Attorney.

United States Patent Office 2,742,127
Patented Apr. 17, 1956

2,742,127

CLUTCHES

Albert Edward Mumford and George Tabberer, Coventry, England, assignors to General Electric Company, a corporation of New York Application March 26, 1952, Serial No. 278,529

5 Claims. (Cl. 192—67)

This invention relates to a coupling device and specifically to the driving clutch member of an engine starting apparatus capable of quick disconnection, for use with a rapidly driven starting motor, such as a gas turbine, and an engine to be started thereby, but its application is not limited thereto, since it can be used with units transmitting power to each other.

With the toothed type of jaw clutch in use at present, it is possible to transmit torque from the driving shaft to the driven shaft while only the tips of the clutch teeth are in engagement with each other. As the tips of the teeth get worn and rounded, the points of engagement between them may lie beyond the plane of the face of the driven teeth. Thus, if the starting cycle is not completed while the teeth tips are contacting each other and the teeth become disengaged during this period, then the acceleration of the driving shaft is so rapid that it is not possible to complete the cycle in the time required for the teeth to move forward into the next driving position and further engagement between the driving and the driven teeth is not feasible without risk of considerable damage to the teeth.

An object of the present invention is to provide an improved and safe positive drive between a rapidly accelerated starter apparatus and an engine to be started.

Another object of our invention is to provide a novel clutch or coupling device by which a positive drive is obtained without driving through the tips of the clutch teeth, irrespective of the relative position of the contacting teeth when rotation of the driving shaft starts.

These and other objects and novel features of our invention appear more fully disclosed in the following description, taken in connection with the accompanying drawing, which is submitted for purposes of illustration only and not as a definition of the limits of the invention, reference for this purpose being made to the appended claims.

In the drawing, like reference characters apply to like parts throughout the several views wherein.

Figure 1:
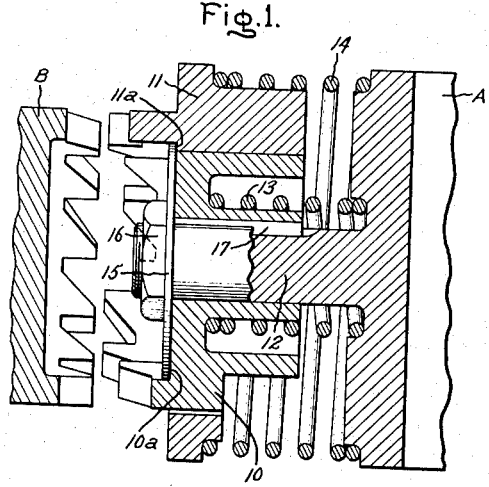
Fig. 1 is a sectional side elevation of the coupling device or jaw clutch showing the starter and engine dogs in position for engagement.

According to the present invention, the starter dog of the coupling device on the driving shaft is constructed of two similar toothed parts, slidably mounted relative to each other and having teeth formed so that half the available driving surface of the teeth is displaced from the other half by a fraction of a tooth pitch.

Referring to the figures of the drawing, which show only sufficient of the driving shaft for an understanding of the invention, the starter dog of the coupling device comprises the two members or elements 10, 11, carried by driving shaft A.

Half of the total number of teeth on member 10 are cut away and an equal number in corresponding position are formed on member 11, designed to slide in that portion of member 10 which has been removed. The teeth formed on member 11 are out of pitch with those on member 10 by some fraction, one-half being preferred. This construction is shown best in the developed view of Fig. 3. It will be seen from Fig. 2 that members 10 and 11 each have three segments to equalize drive therethrough.

The two members 10 and 11 are mounted coaxially on spline shaft 12 which extends from driving shaft A and are individually spring loaded respectively by coaxial springs 13 and 14 against forward stop member 15, which is slipped over the threaded outer end of spline shaft 12 against the recessed ends 10a, 11a, of members 10 and 11 respectively, and fastened in position by nut 16. The starter dog is prevented from rotating about spline shaft 12 by the use of key 17, which locks member 10 thereto.

Figure 3:
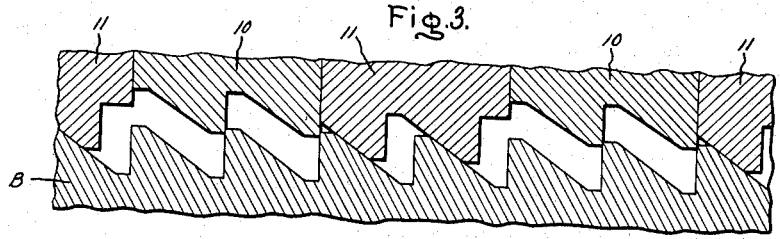
Fig. 3 is a developed partial view of the teeth on the two parts of the starter dog of the coupling device disclosed in Figs. 1 and 2.

With this construction, should the teeth on members 10 and 11 of the starter dog engage the tips of the teeth of the engine dog B on the driven member, as shown in Fig. 3, and slip out of contact therewith while starting, the starter dog does not need to be moved forward, since the teeth on member 11 are already in a position to engage at least half of the depth of the teeth on an engine dog B and will have to rotate only one-half a tooth pitch before taking up the drive. In practice it is found that the drive with half the full depth of the engagement of the teeth is sufficiently effective in an emergency.

When the starting cycle is completed, the speed of the driven engine is such that the teeth on the engine dog begin to overrun the teeth on the starter dog. The angle between the mating teeth is such that the resulting axial force component tends to move the starter dog out of engagement, initially by compression of the springs. This same action occurs when first contact of the dog members is made, for with only the high points touching, the springs yield to prevent damage.

No means are shown to disclose the manner of engagement or disengagement between the dog members of the coupling device, as it is not considered part of the invention, but any known means can be used for mechanical or manual operation therefor. U. S. Patent No. 1,988,206 discloses a typical structure which could be adapted for use with our device.

Figure 4:
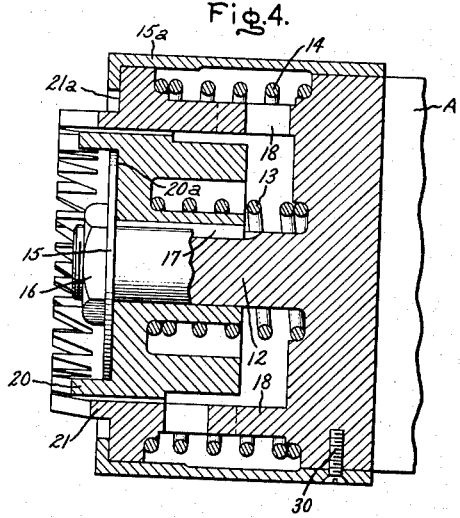
Fig. 4 is a sectional side elevation of an alternate form of coupling device disclosed in Fig. 1
Figure 5:
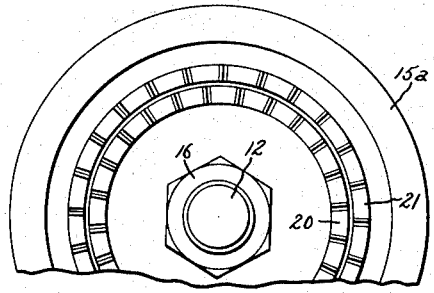
Fig. 5 is a partial end view showing the teeth of two parts of the starter dog of the coupling device shown in Fig. 4.

Referring now to Figs. 4 and 5, which show a modified construction of the starter dog of the coupling device, the component members or elements 20, 21, are designed to fit concentrically about each other around spline shaft 12 and each has a full circle of similarly formed mating teeth. These members are individually spring loaded by springs 13, 14, against forward stop members 15 and 15a. Stop member 15 is slipped over the threaded outer end of spline shaft 12 against the recessed end 20a of starter dog member 20 and fastened in position by nut 16. Stop member 15a is sleeve-like and fastened to driving shaft A by a conventional means such as set screw 30 and has an inwarding extending circumferential lip which fits into the recess 21a on starter dog member 21, thereby restricting forward motion of this member.

Members 20 and 21 are prevented from rotating about driving shaft A by keys 17 and 18 respectively, the former coacting with spline shaft 12 and the latter projecting from the driving shaft A to fit into an appropriate recess on member 21.

These keys fit into recesses on member 20, 21 which have been spaced so that when the members are in assembled relationship, the teeth are displaced by a half tooth pitch or any other conveniently chosen fraction of a pitch (see Fig. 5). When the starter dog is constructed as above, the engaging faces on the teeth of the engine dog are substantially twice the width of the engaging faces of the teeth on each of the concentric members.

Figure 2:
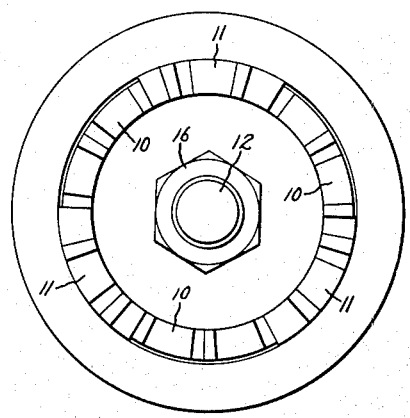
Fig. 2 is an end view of the starter dog of the coupling device or jaw clutch, mounted on the driving shaft as disclosed in Fig. 1.

The action of springs 13 and 14 in the modification disclosed in Figs. 4 and 5 on initial engagement of the teeth on the starter and engine dogs and at the end of the starting cycle, after the engine begins to gain speed, is the same as that described for the structure disclosed in Figs. 1, 2, and 3.

Although a preferred embodiment and modification of our invention has been shown and described, it will be readily understood by those skilled in the art that variations may be made in the disclosed structure without departing from the basic features of our invention. It is desired that our disclosure be considered illustrative and inclusive of all modifications and variations which may fall within the true scope of the appended claims and not limitative to the exact construction therein.

What we claim and desire to secure by Letters Patent of the United States is:

1. In a coupling device, the combination of a driving means and toothed driven means, said driving means comprising a plurality of concentric cylindrical toothed elements slidably mounted for axial movement with respect to each other and to said driven means, the teeth on the respective elements differing by a fraction of a tooth pitch, and having substantially identical mean radii.

2. In a dog type clutch adapted to transmit power from a driving shaft to a driven shaft, corresponding toothed means carried by each of said shafts, the toothed means on said driving shaft comprising a matching pair of concentric cylindrical elements mounted in axial slidable relationship with each other and adapted to be engaged with the tooth means carried by said driven shaft, the teeth on each of said elements having substantially the same mean radii and being dissimilar by a fraction of a tooth pitch.

3. In a device including toothed means adapted to engage corresponding means on a driving shaft for rotative movement therewith, the combination of a pair of concentric cylindrical toothed elements mounted on said driving shaft in axial slidable relationship with each other and with said toothed means, teeth on respective elements being displaced by a fractional tooth pitch and having substantially the same mean radii, means coacting with said shaft for limiting the axial movement of said toothed elements, spring means for biasing said elements against said last-mentioned means, and means coacting with said shaft for effecting rotation of said elements.

4. In a coupling device for transmitting torque from a driving shaft to a driven shaft, a pair of cooperating toothed means attached respectively to the ends of said driving and driven shafts, said toothed means on said driving shaft comprising a pair of concentric cylindrical toothed elements mounted slidably for movement in an axial direction with respect to each other and to said toothed means on said driven shaft, means coacting with said driving shaft for limiting axial movement of said toothed elements, spring means coacting with said driving shaft for biasing said toothed elements into contact relationship with said first-mentioned means, the teeth of said toothed elements being formed to differ with each other by a fraction of a tooth pitch and having substantially identical mean radii, and means coacting with said pair of toothed elements for effecting rotation with said driving shaft.

5. In an engine starting apparatus, a coupling device consisting of a pair of cooperating dog means attached respectively to driving and driven shafts, the dog means of said driving shaft having a protruding spline shaft, a pair of concentric cylindrical toothed members mounted in slidable relationship with each other on said spline shaft and substantially surrounding the same, means coacting with said driving shaft for retaining said toothed members in assembled position, spring means for biasing said toothed members into operative position, the teeth on said toothed members differing from each other by a fraction of a tooth pitch and having substantially the same mean radii, and means for ensuring rotation of said toothed members.

References Cited in the file of this patent

UNITED STATES PATENTS

| 728,802 | Kuhlewind | May 19, 1903 |
| 918,610 | Tschantz | Apr. 20, 1909 |
| 1,343,487 | Swift | June 15, 1920 |

FOREIGN PATENTS

| 718,972 | Germany | Mar. 25, 1942 |